United States Patent
Mattarella et al.

[19]

[11] Patent Number: 5,913,562
[45] Date of Patent: Jun. 22, 1999

[54] ACCESS HANDGRIPS FOR USE DURING INGRESS AND EGRESS FROM A VEHICLE

[75] Inventors: Bruce P. Mattarella, Canton; Charles E. Harland, Livonia; Ronald A. Cripe, Farmington Hills; Steven M. Jakubiec, Bloomfield; Steven R. Swailes, Auburn Hills, all of Mich.

[73] Assignee: Chrysler Corporation, Auburn Hills, Mich.

[21] Appl. No.: 08/997,639

[22] Filed: Dec. 23, 1997

[51] Int. Cl.⁶ ........................................ B60J 1/08
[52] U.S. Cl. ............................. 296/152; 296/191
[58] Field of Search ................. 296/39.1, 65.01, 296/65.09, 71, 191, 152, 64; 297/49.2

[56] References Cited

U.S. PATENT DOCUMENTS

| | | |
|---|---|---|
| 2,564,924 | 8/1951 | Patton . |
| 3,451,500 | 6/1969 | Porsche et al. . |
| 3,642,322 | 2/1972 | Bilancia . |
| 3,728,819 | 4/1973 | Goldbach et al. ................... 49/216 |
| 3,802,738 | 4/1974 | Tantlinger . |
| 4,023,827 | 5/1977 | Matalonis et al. . |
| 4,072,339 | 2/1978 | Rothlisberger . |
| 4,194,782 | 3/1980 | Itoh ........................................ 296/64 |
| 4,226,464 | 10/1980 | Janz et al. ............................. 296/153 |
| 4,266,318 | 5/1981 | Dauwalder . |
| 4,626,016 | 12/1986 | Bergsten . |
| 4,836,597 | 6/1989 | Izumida . |
| 4,949,508 | 8/1990 | Elton ..................................... 296/39.1 |
| 5,390,973 | 2/1995 | Melotti ................................. 296/152 |
| 5,492,386 | 2/1996 | Callum ................................. 296/64 |
| 5,524,960 | 6/1996 | Toensend ............................. 296/155 |
| 5,584,096 | 12/1996 | Aurora ................................. 16/111 |
| 5,605,368 | 2/1997 | Noma et al. ......................... 296/64 |
| 5,611,589 | 3/1997 | Fujii et al. ........................... 296/64 |
| 5,805,402 | 9/1998 | Maue et al. ......................... 361/93 |

FOREIGN PATENT DOCUMENTS

| | | | |
|---|---|---|---|
| 2510-172 | 9/1976 | Germany ............................. 296/71 |
| 60-15231 | 1/1985 | Japan ................................... 296/71 |

*Primary Examiner*—Joseph D. Pape
*Assistant Examiner*—Kiran Patel
*Attorney, Agent, or Firm*—Roland A. Fuller, III

[57] ABSTRACT

A passenger land vehicle is provided in which a row of seats is located generally between a pair of doors. A rear seat is positioned behind the front seat and access to the rear seat is gained primarily through the doors. A first hand grip is formed in the front seat and a second hand grip is formed in an interior body panel disposed on an outer wall of the passenger compartment of the vehicle rearward of the door in order to facilitate ingress and egress to and from the vehicle. The hand grips provide a convenient support for each of the passenger's hands while the passenger is entering and exiting the vehicle.

3 Claims, 3 Drawing Sheets

ACCESS HANDGRIPS FOR USE DURING INGRESS AND EGRESS FROM A VEHICLE

BACKGROUND OF THE INVENTION

1. Field of the Invention

The present invention relates to vehicles and a system for facilitating ingress and egress to and from the vehicle, and more particularly, to access hand grips adapted for use in connection with enhanced capacity vehicles, (ECVs) such as sport utility vehicles and vans, that have an enlarged cabin area for carrying either more cargo or more passengers than in a conventional sedan.

2. Description of the Related Art

In recent years, ECVs have become increasingly popular. In particular, sport utility vehicles and vans have become extremely popular, as they provide vehicles having sufficient room for comfortably transporting a family and/or cargo. The ECVs are characterized by a large cabin area that extends from the windshield to the rear end of the vehicle where the tailgate (or rear hatch) provides rear access into the cabin. The increase in popularity of these vehicles can be attributed in some measure to their increased passenger carrying capacity when compared to conventional sedans.

Most sedans include two rows of seats, a front row and a rear row. A driver and one or more passengers sit in a first, front row of seats, and additional passengers sit in a second row of seats. Many ECVs also include a third row of seats placed behind the second row. In such a configuration, the first row may be referred to as the front row or seat, the second row may be referred to as the middle row or seat, and the third row may be referred to as the rear row or seat.

ECVs may have a two, three, or four side door configuration. In a two door configuration, the doors are generally aligned with the front row or seat to enable relatively uninhibited ingress and egress into and from the front seat. In a two door vehicle, the front seats are configured generally to be moved forward to enable ingress and egress through the doors into the row of seats behind the front seat. Many ECVs also include one or a pair of rear doors behind the front doors. The rear door or doors are typically aligned with the second or middle row of seats to enable relatively uninhibited ingress and egress into and from the second or middle row of seats. In ECVs having either a third and/or fourth door and having a third or rear row of seats, the second or middle row of seats generally may be moved forward to facilitate passage by the middle row of seats to enter the rear row of seats.

In addition to being configured to carry more passengers and/or cargo than a conventional sedan, a great majority of ECVs include a higher platform than an average sedan. While this provides increased visibility for the driver and also facilitates design and operation of the vehicle, passengers often have more difficulty entering and exiting ECVs. This occurs primarily for two reasons. First, because the ECVs are higher, passengers generally have to step up and lift themselves into the vehicle. Second, when passengers enter the vehicle to sit behind the row of seats which is generally adjacent to the vehicle door through which the passenger enters, the passenger must slide beside the vehicle seat generally adjacent to the door while simultaneously stepping upward, lifting themselves into the vehicle. Similarly, when exiting the vehicle, particularly from a row of seats behind the seats that are adjacent to the door that the passenger is using, the passenger often must move forward through a relatively narrow area while simultaneously stepping down to exit the vehicle. While neither movement is particularly difficult, present vehicles could be better ergonomically configured to assist passengers with the lifting up and stepping down movements and the forward and afterward movements through the vehicle.

Thus, it is an object of the present invention to facilitate ingress and egress into and from a vehicle.

It is a further object of the present invention to facilitate ingress and egress into and from a row of passenger seats which are located behind a row of passenger seats adjacent to the vehicle door used to access the rearward row of seats.

It is yet a further object of the present invention to provide access hand grips for use during ingress and egress to and from the vehicle.

SUMMARY

A passenger land vehicle is provided that comprises a vehicle body including a pair of door located on opposite sides of a passenger compartment. A first seat assembly is located in the passenger compartment generally between the pair of doors. A second seat assembly is located behind the first seat assembly. An interior body panel is disposed on an outer wall of the passenger compartment to the rear of one of the pair of doors. The interior body panel includes a hand grip to assist a passenger in entering the vehicle passenger compartment through one of the pair of doors to obtain access to the second seat assembly.

A passenger land vehicle is also provided including a vehicle body having a pair of front doors and a pair of rear doors on opposite sides of a passenger compartment. A front seat assembly is located in the front portion of the passenger compartment generally between the pair of front doors. A middle seat assembly is located in a middle portion of the passenger compartment, generally between the pair of rear doors. A rear seat assembly is located in the rear portion of the passenger compartment. The middle seat assembly includes at least one portion which moves from a position to receive seated passengers to a second position forward of the first position to allow access to the rear seat assembly through at least one of the pair of rear doors. The one seat portion includes a seat bottom and seat back which pivot relative to each other, and the seat bottom also pivots with respect to the floor of the vehicle. The seat portion includes a hand grip which is accessible to the passenger when the seat assembly is in the second position, where the hand grip assists the passenger in entering the vehicle passenger compartment through the rear door to obtain access to the rear seat assembly.

Additional objects, features, and advantages of the present invention will become apparent from the following description and the appended claims, taken in conjunction with the accompanying drawings.

DETAILED DESCRIPTION OF THE INVENTION

Figure 1:
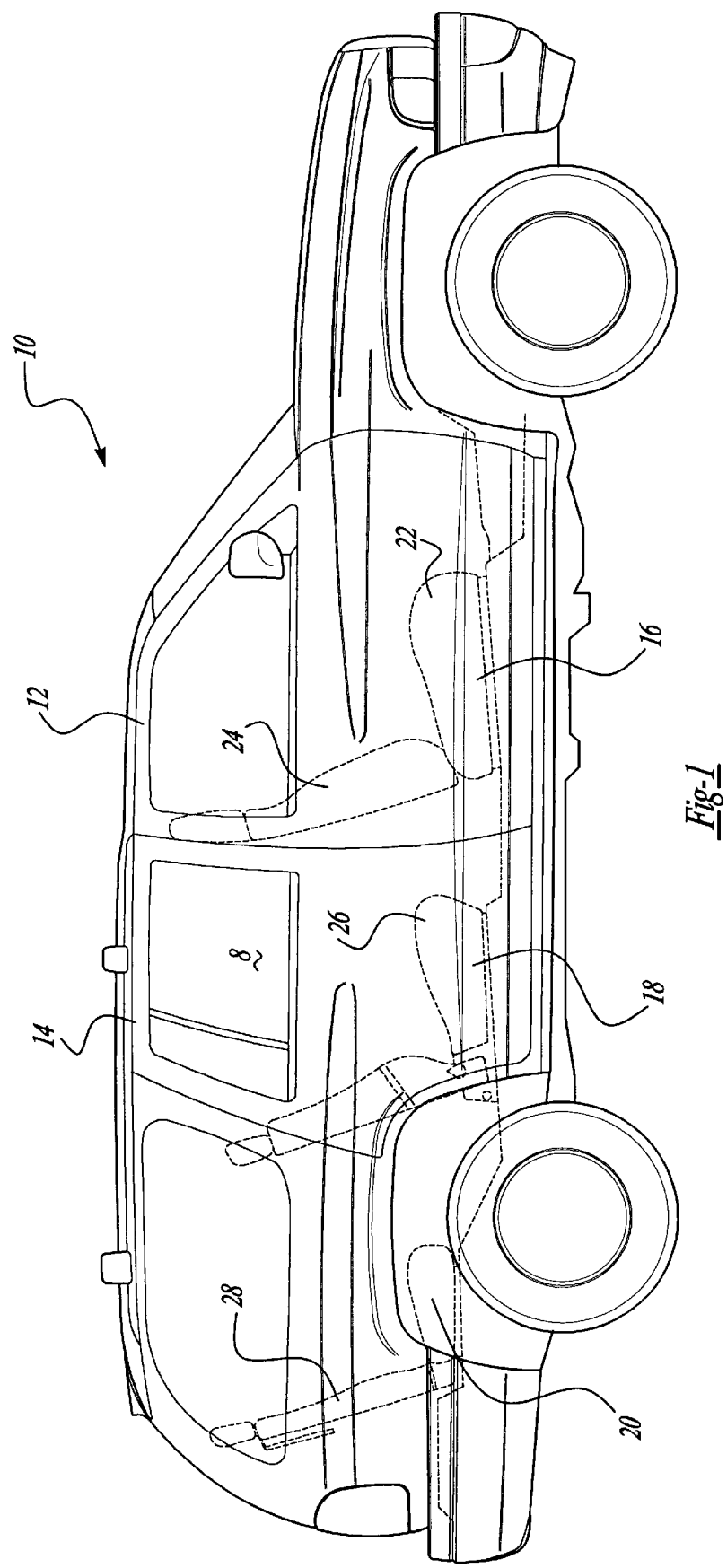
FIG. 1 is a side view of a vehicle arranged in accordance with the present invention.
Figure 2:
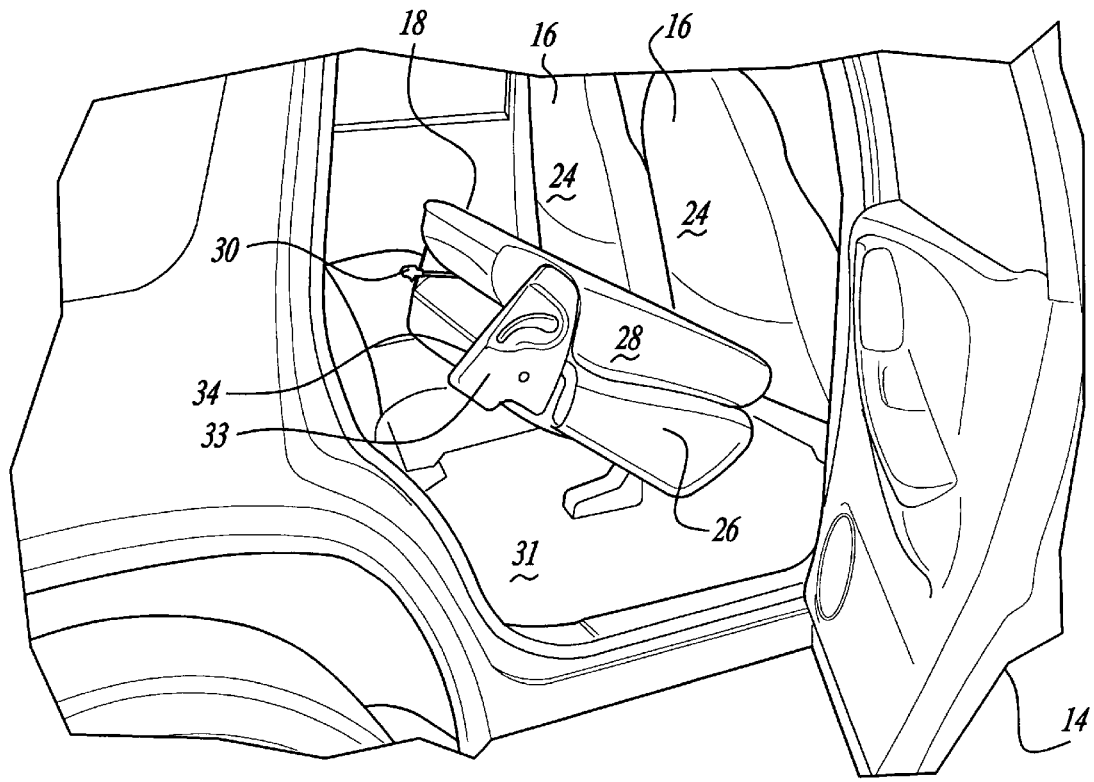
FIG. 2 is a perspective view from the outside of the vehicle of an articulating seat having access hand grips arranged in accordance with the principals of the present invention.
Figure 3:
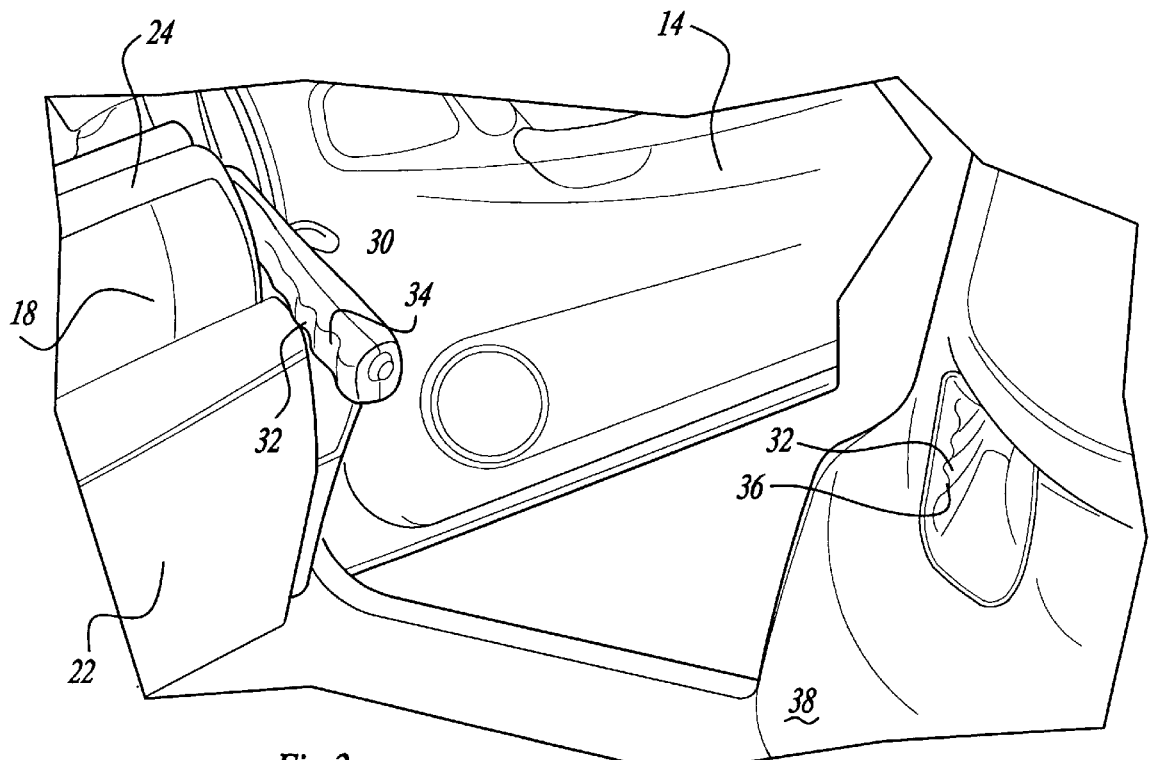
FIG. 3 is a perspective view from the vehicle interior of the access hand grips for use during the ingress and egress into and from the vehicle.

Referring to FIGS. 1–3, an ECV or a vehicle 10 is shown having a passenger compartment 8 arranged in accordance with the principals with the present invention. The vehicle 10 is shown herein as a sport utility vehicle, but one skilled in the art will recognize that the principles of the present invention apply to other vehicles including station wagons and vans. Vehicle 10 includes a pair of front doors 12 positioned on opposite sides of the vehicle and a pair of rear doors 14 positioned on opposite sides of vehicle 10 behind front doors 12. Doors 12 and 14 generally attach to the vehicle by a pair of forwardly located hinges (not shown) so that the rear portion of the door pivots outward from the vehicle to open doors 12 and 14 and enable passengers to enter and exit vehicle 10. Vehicle 10 also includes a front seat assembly 16 positioned generally between the pair of front doors 12 and a middle seat assembly 18 positioned generally between rear doors 14. Vehicle 10 also includes a rear seat assembly 20 positioned behind middle seat assembly 18. As shown herein, seat assemblies 16, 18, and 20 are each shown as a pair of bucket seats. One skilled in the art will recognize that captain's seats and bench seats may be substituted for the bucket seats described herein.

With particular reference to FIGS. 2 and 3, which show a first embodiment of the present invention, middle seat assembly 18 includes a bench portion 26 and a seat back portion 28. The bench portion 26 and seat back portion 28 interconnect and pivot relative to each other so that the bench portion 26 and seat back portion 28 fold together upon actuation of a latch 30. In the present embodiment, actuation of latch 30, in addition to enabling bench portion 26 and seat back portion 28 to fold together, also enables bench portion 26 to articulate about a pivot point attached to the floor 31 of vehicle 10. In this manner, middle seat assembly 18 folds together and articulates forward toward the seat back portion 24 of front seat assembly 16 to create a wider pathway for a passenger to pass behind middle seat assembly 18 to rear seat assembly 20.

In addition to articulating forward to facilitate passenger entry to rear seat 20, a hand grip 34 is formed on an interior portion of side molding 33. When entering rear door 14 on the passenger side, as shown in the views of FIGS. 2 and 3, a passenger would grip hand grip 34 with a right hand when entering and exiting the vehicle while facing the passenger compartment 8. To further facilitate ingress and egress into and from vehicle 10, a second hand grip 36 is placed along an interior body panel 38. Second hand grip 36 is preferably formed integrally as a depression in interior body panel 38. However, it should be undersood that the hand grip 36 can be molded as a cup-type insert which can be inserted in an opening in the interior body panel 38. Body panel 38 is disposed on an outer wall of passenger compartment 8. Hand grip 36 also has finger grooves 32 to facilitate use.

In this manner, when a passenger enters the vehicle 10 from the passenger side while facing the interior of passenger compartment 8, the passenger places a right hand on hand grip 34 and a left hand on hand grip 36. Hand grips 34 and 36 thus provide convenient placement of the hands of the passenger while entering and exiting vehicle 10. In addition, hand grips 34 and 36 are positioned so as to be recessed so that hand grips 34 and 36 do not protrude and do not interfere with movement within passenger compartment 8.

Figure 4:
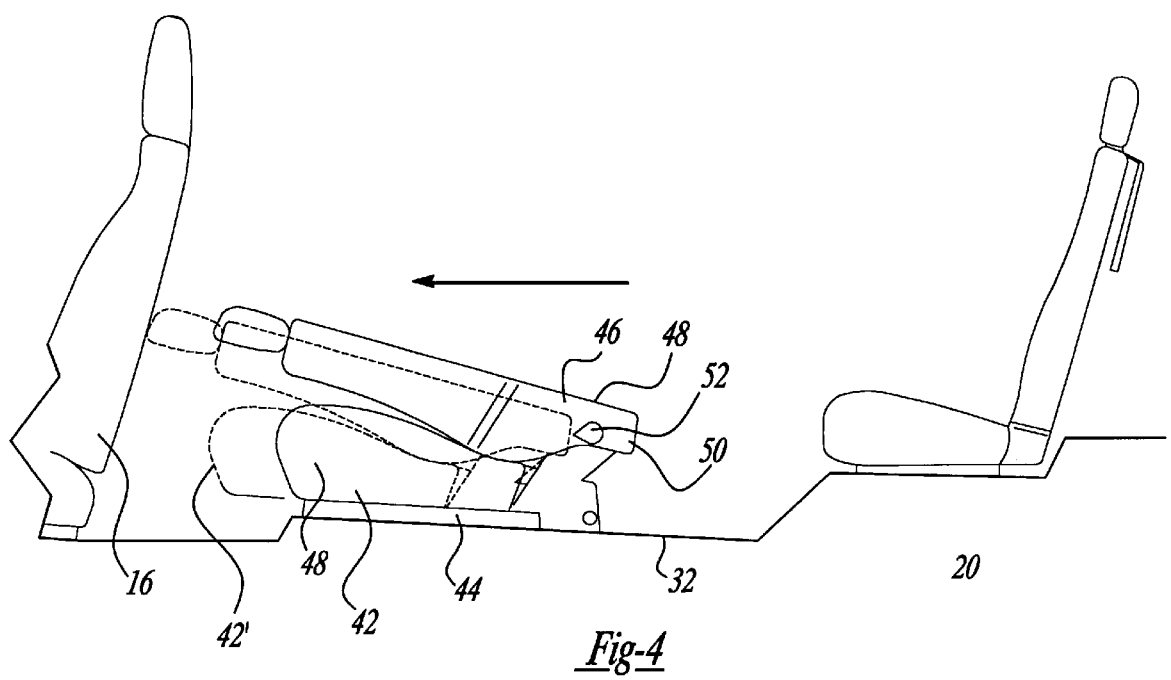
FIG. 4 is a left side view of an alternative seat configuration having hand grips for use during ingress and egress into and from the vehicle.

FIG. 4 is an alternative embodiment of the apparatus of the present invention. FIG. 4 demonstrates an alternative middle seat assembly 42 configuration. Rather than articulating about a pivot point on the vehicle floor 31 as shown in FIG. 2, middle seat assembly 42 slides forward and aftward along a track 44 formed in the floor 31 of vehicle 10. Middle seat assembly 42 also includes a seat back portion 46 and bench portion 48. Seat back portion 46 and bench portion 48 pivot with respect to each other so as to fold from an upright position, in which passengers may sit in seat 42, to an entry position facilitating access to rear seat assembly 20. Actuation of latch 52 enables seat back 46 to fold toward bench portion 48. Seat 42 slides from a rearward position in which the seat is locked in place while the vehicle is in motion, to an access position 42', shown in phantom, to facilitate ingress and egress into and from the vehicle. Middle seat assembly 42 may also include a hand grip 54 (similar to hand grip 34, as described above) formed on an interior portion of a side molding 50 to similarly assist a passenger with ingress and egress to and from vehicle 10 as described with respect to FIGS. 2 and 3.

From the foregoing, it can be seen that the present invention provides a novelty apparatus for use during ingress and egress from a vehicle. In particular, the hand grips, one on a vehicle seat and one on an interior panel formed in an outer wall of the passenger compartment, facilitates ingress and egress to and from the vehicle.

Although the invention has been described with particular reference to certain preferred embodiment's thereof, variations and modifications can be effected within the spirit and scope of the following claims.

What is claimed is:

1. A passenger land vehicle, comprising:
    a vehicle body including a pair of doors disposed on opposite sides of a passenger compartment;
    a first seat assembly disposed in said passenger compartment generally between said pair of doors;
    a second seat assembly disposed behind said first seat assembly; and
    an interior body panel disposed on an outer wall of said passenger compartment rearward of one of said pair of doors, said interior body panel including a hand grip to assist a passenger in entering said vehicle passenger compartment through said one of said pair of doors to obtain access to said second seat assembly.

2. The passenger land vehicle according to claim 1, wherein said hand grip is recessed in said interior body panel.

3. The passenger land vehicle according to claim 2, wherein said hand grip includes a plurality of finger grooves.

* * * * *